(12) United States Patent
Francis

(10) Patent No.: US 8,400,409 B1
(45) Date of Patent: Mar. 19, 2013

(54) USER INTERFACE DEVICES, METHODS, AND COMPUTER READABLE MEDIA FOR SENSING MOVEMENT OF AN ACTUATOR ACROSS A SURFACE OF A WINDOW

(75) Inventor: Mark Francis, Toronto (CA)

(73) Assignee: Cypress Semiconductor Corporation, San Jose, CA (US)

( * ) Notice: Subject to any disclaimer, the term of this patent is extended or adjusted under 35 U.S.C. 154(b) by 748 days.

(21) Appl. No.: 12/218,021

(22) Filed: Jul. 10, 2008

Related U.S. Application Data

(60) Provisional application No. 60/948,957, filed on Jul. 10, 2007.

(51) Int. Cl.
*G06F 3/01* (2006.01)
*G01R 27/26* (2006.01)
*G09G 5/08* (2006.01)

(52) U.S. Cl. ......... 345/173; 324/678; 324/688; 345/157

(58) Field of Classification Search .................. None
See application file for complete search history.

(56) References Cited

U.S. PATENT DOCUMENTS

| | | | | |
|---|---|---|---|---|
| 5,933,102 | A * | 8/1999 | Miller et al. ................... | 341/33 |
| 7,030,860 | B1 * | 4/2006 | Hsu et al. ....................... | 345/173 |
| 7,116,117 | B2 * | 10/2006 | Nakano et al. ................ | 324/688 |
| 7,274,808 | B2 | 9/2007 | Baharav et al. | |
| 7,557,338 | B2 | 7/2009 | Gruhlke et al. | |
| 2004/0208348 | A1 | 10/2004 | Baharav et al. | |
| 2007/0052684 | A1 * | 3/2007 | Gruhlke et al. ................ | 345/173 |
| 2007/0075710 | A1 * | 4/2007 | Hargreaves et al. .......... | 324/658 |
| 2007/0215793 | A1 | 9/2007 | Gruhlke et al. | |
| 2008/0006762 | A1 * | 1/2008 | Fadell et al. ................ | 250/201.1 |
| 2008/0094356 | A1 * | 4/2008 | Ording et al. ................. | 345/157 |
| 2012/0002693 | A1 | 1/2012 | Hasegawa et al. | |

FOREIGN PATENT DOCUMENTS

| | | |
|---|---|---|
| CN | 102105895 A | 6/2011 |
| DE | 102009005092 A1 | 9/2010 |
| EP | 0404678 A | 12/1990 |
| EP | 2387744 A1 | 11/2011 |
| GB | 2400713 A | 10/2004 |
| JP | 2004318890 A | 11/2004 |
| KR | 20110051165 A | 5/2011 |
| WO | 2009114821 A2 | 9/2009 |
| WO | 2010081652 A | 7/2010 |

OTHER PUBLICATIONS

U.S. Appl. No. 13/248,355 "Optical Navigation Module With Capacitive Sensor," Jinghui Mu et al., filed Sep. 29, 2011; 33 pages.
U.S. Appl. No. 61/502,298 "Optical Finger Navigation Sensor with Capacitive Sensing," Brett Spurlock et al., filed Jun. 28, 2011; 21 pages.
Application No. PCT/US11/53552 "An Optical Navigation Module With Capacitive Sensor," Filed on Sep. 27, 2011; 31 pages.
KIPO ISR/WO for Application No. PCT/US2011/053552 dated May 23, 2012; 10 pages.

\* cited by examiner

*Primary Examiner* — Alexander S Beck
*Assistant Examiner* — Kirk Hermann

(57) ABSTRACT

An interface device and method are provided for sensing movement of an actuator across a surface of a window in an enclosure thereof. The interface device comprises an optical navigation sensor including an illuminator within the interface to illuminate at least a portion of the actuator through the window when the actuator is positioned in contact with or proximal to the surface of the window, and a detector to receive light reflected through the window from the actuator. The interface device further includes a number of capacitive guard-sensors in the enclosure adjacent to the optical navigation sensor to disable the optical navigation sensor when a conductive body is sensed in proximity to the guard-sensors.

18 Claims, 4 Drawing Sheets

USER INTERFACE DEVICES, METHODS, AND COMPUTER READABLE MEDIA FOR SENSING MOVEMENT OF AN ACTUATOR ACROSS A SURFACE OF A WINDOW

CROSS-REFERENCE TO RELATED APPLICATION

The present application claims the benefit of priority under 35 U.S.C. 119(e) to U.S. Provisional Patent Application Ser. No. 60/948,957, entitled "Laser Navigation Sensor," filed Jul. 10, 2007, which application is hereby incorporated by reference in its entirety.

TECHNICAL FIELD

The present disclosure relates generally to a user interface device, and more particularly to a user interface device including an optical navigation sensor and a guard-sensor to enable the optical navigation sensor.

BACKGROUND

User or human interface devices, such as scroll-wheels, scroll-balls, touch-screens and touchpads, are widely used in a number of applications to interface with and input data into a number of electronic products including personal computers, workstations, personal digital assistants (PDAs), cellular telephones, digital media players and the like.

Scroll-wheels and scroll-balls include mechanical sensors that require openings to be made in the device's enclosure, and thus render the scroll-wheel or scroll-ball and the electronic product are susceptible to failure due to moisture and dirt.

Conventional touch-screens or touch-pads while eliminating the need for an opening into the device's enclosure typically require a large navigation area on the end product, and thus are not suitable in a number of applications including for use with portable or handheld products.

SUMMARY

A user interface device and method are provided for sensing movement of an actuator, such as a finger or thumb, across a surface of a window in an enclosure thereof. The interface device includes an optical navigation sensor and a number of capacitive guard-sensors in the enclosure adjacent to the optical navigation sensor to disable the optical navigation sensor when a large, conductive body, such as a palm or hand, is sensed in proximity to the guard-sensors, thereby substantially eliminating inadvertent inputs through the optical navigation sensor. The optical navigation sensor includes an illuminator within the enclosure to illuminate at least a portion of the actuator through the window when the actuator is positioned in contact with or proximal to the surface of the window, and a detector to receive light reflected through the window from the actuator.

BRIEF DESCRIPTION OF THE DRAWINGS

These and various other features of the interface device and methods for using the same will be apparent upon reading of the following detailed description in conjunction with the accompanying drawings and the appended claims provided below, where:

DETAILED DESCRIPTION

The present disclosure is directed generally to interface devices capable of being used with a number of electronic products or devices. More particularly the disclosure is directed to an interface device including an optical navigation sensor to sense displacement of an actuator, such as a finger or thumb, relative to a surface of the interface device and one or more touch or proximity sensitive guard-sensors or switches to enable or disable the optical navigation sensor. The interface device and method are particularly useful in hand held or portable computing, communication or media products, such as notebook computers, workstations, personal digital assistants (PDAs), cellular telephones, digital media players and the like.

For purposes of clarity, many of the details of user interface devices in general and optical navigation sensors in particular, which are widely known and not relevant to the present control system and method have been omitted from the following description. Optical navigation sensors are described, for example, in commonly assigned U.S. Pat. No. 7,138,620, entitled, "Two-Dimensional Motion Sensor," by Jahja Trisnadi et al., issued on Nov. 21, 2006.

Figure 1A:
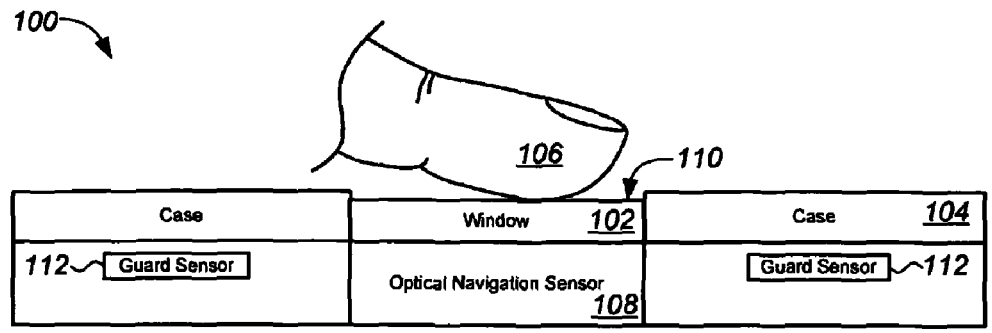
FIG. 1A is a block diagram in cross-section of an interface device including an optical navigation sensor and a guard-sensor in an embodiment.
Figure 1B:
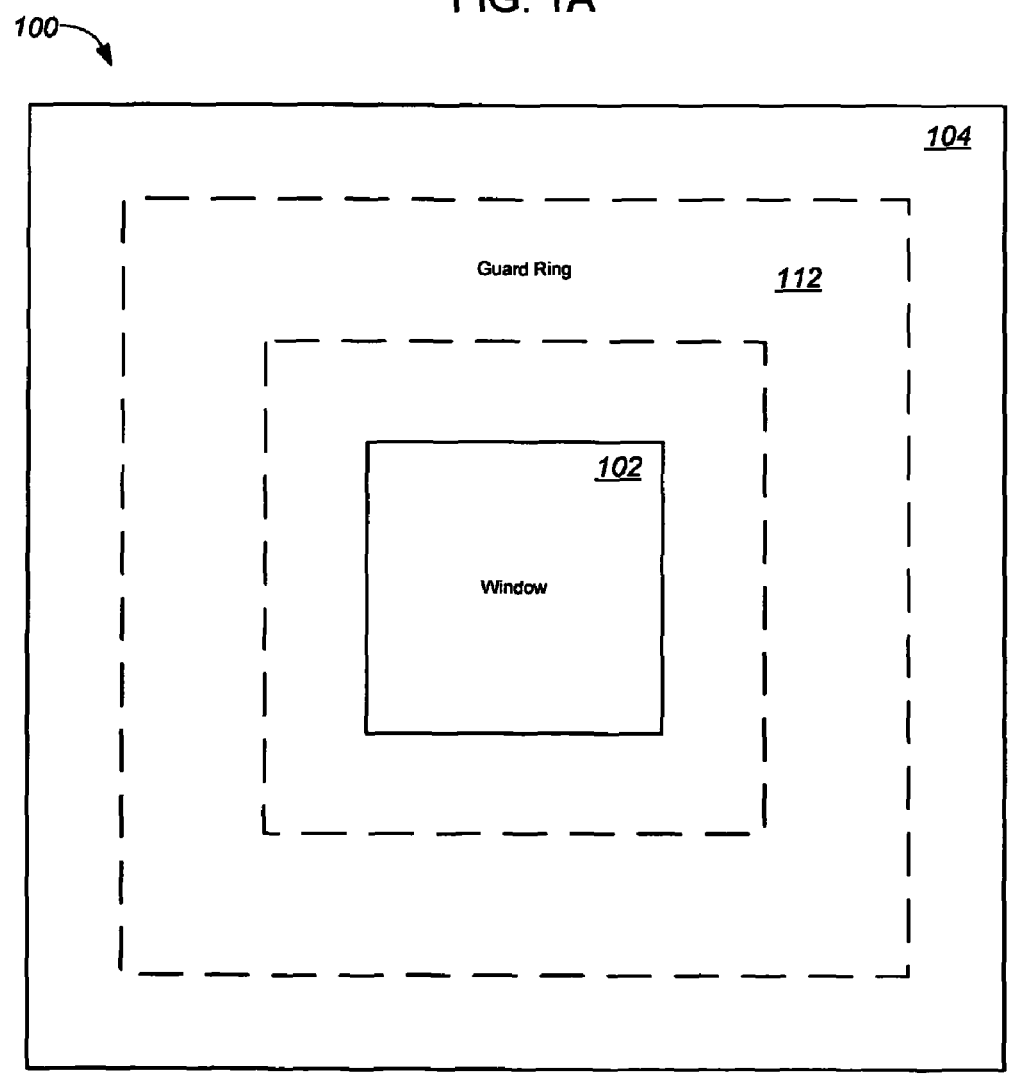
FIG. 1B is a block diagram of a planar top view of the interface device of FIG. 1A illustrating the layout or position of the guard-sensor relative to a window to the optical navigation sensor in an embodiment.

A functional block diagram of an interface device including an optical navigation sensor and a guard-sensor is shown in FIGS. 1A and 1B. Referring to FIG. 1A, the interface device 100 generally includes a small window 102 or lens assembly in an enclosure 104 or case of a product (not shown) to allow an actuator 106, such as a finger, thumb or stylus, to be tracked; an optical or laser navigation sensor 108 to track movement of the actuator over a surface 110 of the window;

and one or more touch or proximity sensitive sensors or switches including guard-sensors 112 to enable or activate the optical navigation sensor.

The window 102, although shown as filling a substantially square opening in the enclosure 104 and a substantially uniform thickness between two parallel surfaces, it is not so limited and can include an optically active element in an opening with any shape adapted to the interface device 100 or product in which it is included. For example, in embodiments where the interface device 100 functions as one-dimensional device sensing movement along a single dimension or axis, the window 102 can comprise a rectangular shape to indicate to a user the direction along which motion is sensed. In other embodiments the window 102 can include an optically active element such as a lens with one or more convex or concave surfaces to focus light on the actuator 106, the optical navigation sensor 108, or to correspond to the shape of the actuator, i.e., concave to receive a tip of a finger or thumb.

The guard-sensors 112 can include one or more capacitive sensors, each with a number of dielectric sensor traces coupled to a processor configured to detect changes in the sensor capacitance induced by proximity of a conductive body. Suitable capacitive sensors can include any capacitive sensor capable of fitting within the enclosure 104 of a portable or battery operated device. For example, one suitable capacitive sensor or system can be developed using a CY3240 USBI2C development kit and software, commercially available from Cypress Semiconductor Corp., of San Jose, Calif. Generally, the guard-sensors 112 include one or more capacitive sensors configured to disable the optical navigation sensor 108 when a large, conductive body, such as a palm or hand, is sensed in proximity to the capacitive sensors. One possible embodiment or layout for the guard-sensors 112 is as a guard-ring located in the enclosure 104 and circumscribing the window 102 as illustrated in FIG. 1B. In another layout (not shown) the guard-sensors 112 can include two or more discrete capacitive sensors located in the enclosure 104 on different sides of the window 102 and/or optical navigation sensor 108. A large, conducting body, i.e., a hand and not just a finger or thumb, inadvertently placed over the entire interface device 100 would be sensed by at least two capacitive sensors located on different sides of the window 102 and/or optical navigation sensor 108, disabling the optical navigation sensor.

Additionally, the guard-sensors 112 can be further configured to sense an actuator, such as a thumb or finger, for additional input or select operations. This can be accomplished by programming or configuring a processor of the guard-sensor 112 to detect and distinguish between a threshold change in capacitance induced by a thumb or finger, and that induced by a large, conducting body, such as a hand.

Figure 2:
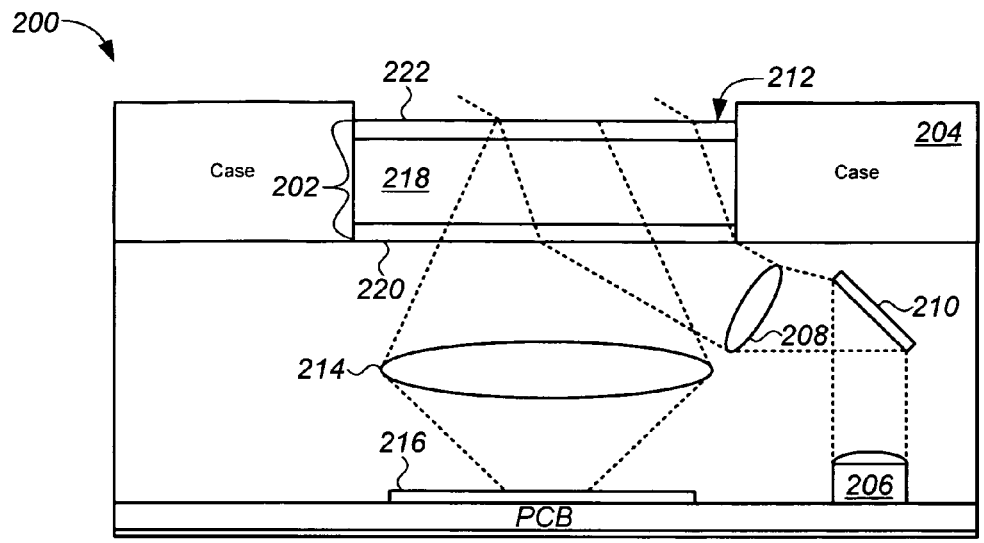
FIG. 2 is a schematic block diagram in cross-section of an optical navigation sensor of an interface device in an embodiment.

A schematic block diagram of an embodiment of an optical navigation sensor of the interface device is shown in FIG. 2. Referring to FIG. 2, the optical navigation sensor 200 includes an illuminator 201 and a detector 203 positioned on or above a printed circuit board (PCB) opposite a window 202 an enclosure 204 of the interface device. The illuminator comprises a light source 206 and illumination optics, such as one or more lens 208, mirrors 210 and/or prisms (not shown) to illuminate at least a portion of an actuator (not shown in this figure) through the window 202 when the actuator is positioned in contact with or proximal to a surface 212 thereof. The detector includes imaging optics, such as one or more lens 214, mirrors or prisms to receive light reflected through the window from the actuator, and to transmit or focus the reflected light onto an array or arrays 216 of one or more photosensitive elements, such as photodiodes (not shown), to track movement of the actuator in one or two-dimensions across the surface 212 of the window 202.

In one embodiment, the optical navigation sensor 200 can be a speckle-based optical navigation sensor including a narrow-band or coherent light source 206. Speckle-based optical navigation sensors use a coherent light source, such as a Vertical Cavity Surface Emitting Laser (VCSEL), to scatter light off of an optically rough or irregular surface to generate a random intensity distribution of light known as speckle. In general, any surface with topological irregularities greater than the wavelength of light from the light source 206 will scatter light into a complete hemisphere in approximately a Lambertian fashion. If a coherent light source is used, the spatially coherent, scattered light will create a complex interference pattern upon detection by a square-law detector with finite aperture. This complex interference pattern of light and dark areas is termed speckle. The exact nature and contrast of the speckle pattern depends on the surface roughness, the wavelength of light and its degree of spatial-coherence, and the light-gathering or imaging optics. Although often highly complex, a speckle pattern is distinctly characteristic of a section of any surface that is imaged by the optical navigation sensor 200 and, as such, can be employed to track displacement of the actuator.

The use of a speckle-based optical navigation sensor 200 has several advantages, including efficient laser-based light generation and high contrast images even under illumination at normal incidence. This allows for a more efficient operation and conserves power consumption, which is desirable in wireless applications. Additionally, because VCSELs used in speckle-based sensors generally operate in infrared (IR) at wavelengths of from about 750 nanometers (nm) to about 950 nm, and more typically at a wavelength of 850 nm, photosensitive elements of the array 216 can be selected to be sensitive to IR light and substantially insensitive to other wavelengths of light, such as ambient or environmental light.

In other embodiments, the window 202 can include filter elements or layers to further improve a signal quality in the optical navigation sensor 200 by filtering the light passing therethrough. The filter-window can improve a signal quality of the optical navigation sensor 200 by filtering background light, such as environmental or ambient light in the visible spectrum, which would otherwise appear as noise to the sensor. A filter-window also reduces dynamic range requirements of the optical navigation sensor 200, and in particular of the imaging optics (lens 218) and the photosensitive elements of the array 216.

Referring to FIG. 2, the window 202 can include one or more layers of plastic, glassine or crystalline materials that are substantially transparent to at least one wavelength of light emitted by the light source 206 and sensed by the array 216 of photosensitive elements. In the embodiment shown, the window 202 includes at least one filter layer 218 having a thickness and a light absorbent dopant, tint or shading selected to block at least some light, such as ambient or environmental light, having wavelengths different from those of the light source. Suitable filter layer 218 materials can include, for example, POLY-IR® commercially available from Fresnel Technologies, Inc., of Fort Worth, Tex. Inner and/or outer layers of the window 220, 222, can be selected for physical or optical properties, such as abrasion resistance, strength and/or low reflection of light from the light source 206 or reflected from the actuator. Low reflection may be achieved through the use of an additional anti-reflective coatings (ARC) or layers.

Figure 3:
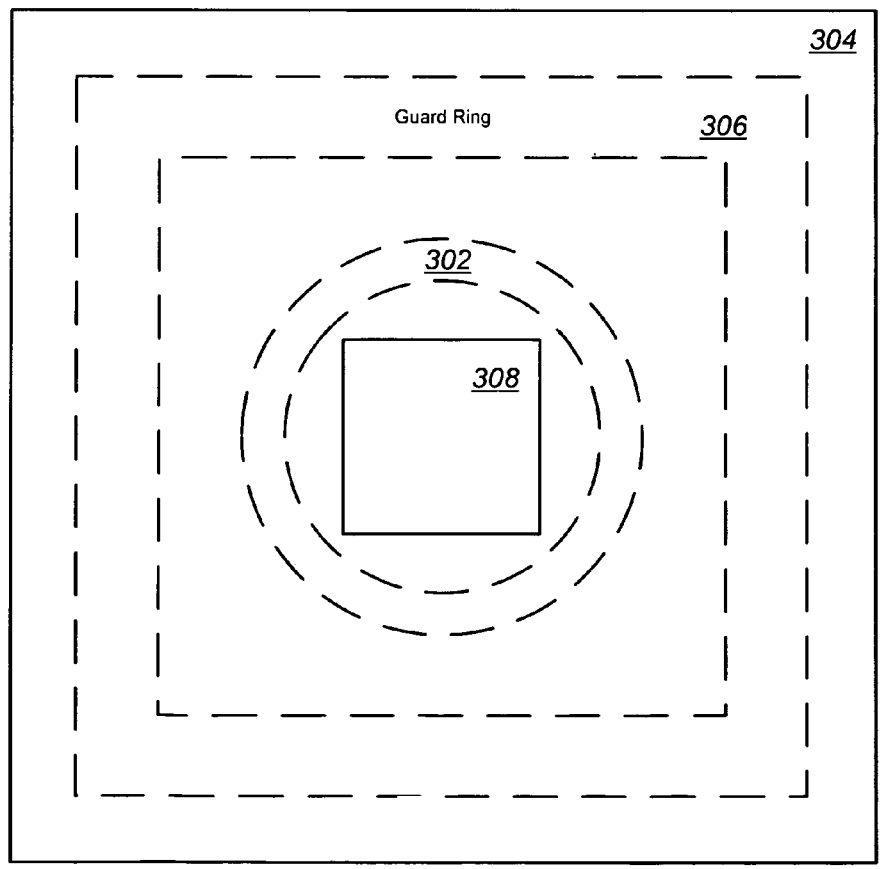
FIG. 3 is a block diagram of a planar top view of an interface device including additional touch or proximity sensors between the guard-sensor and window to the optical navigation sensor for additional input or selection operations in an embodiment.

In another aspect, the interface device further includes a number of additional touch or proximity sensitive sensors adjacent to the optical navigation sensor for additional input or select operations. In the embodiment shown in FIG. 3, the interface device 300 includes a number of additional or second capacitive sensors 302 in the enclosure 304 between the guard-sensors 306 and the window 308. Although shown as a ring of one or more sensors surround the window 308, it will be appreciated that their layout is it is not so limited and the second capacitive sensors 302 can include one or more discrete capacitive sensors in the enclosure 304 located on any side of the window.

It will further be appreciated that by selecting a threshold change in capacitance for the second capacitive sensors 302 lower than that of the guard-sensors 306 the second capacitive sensors can sense or be operated by an actuator, such as a thumb or finger, rather than a large, conducting body, such as a hand. Because the threshold of the second capacitive sensors 302 is lower than that of the guard-sensors 306, use of the second capacitive sensors to enable the device 300 does not conflict with the function of the guard-sensors, i.e., to disable the optical navigation sensor to eliminate inadvertent input when a large, conducting body substantially covers the interface device 300. That is a gesture with an actuator or finger proximal to the second capacitive sensors 302 to enable the optical navigation sensor would not be sufficient to cause the guard-sensors 306 to disable it. Additionally, the guard-sensors 306 can be further configured to disable the second capacitive sensors 302 in a manner similar to that of the optical navigation sensor to eliminate inadvertent input when a large, conducting body substantially covers the interface device 300.

The second capacitive sensors 302 can be used, for example, by the user to select a function highlighted by a cursor controlled by the optical navigation sensor using a tap or double tap gesture. The second capacitive sensors 302 can also be used to affirmatively activate or enable the optical navigation sensor prior to an initial use or following a time in which it is idle for a predetermined period. This last embodiment or use for the second capacitive sensors 302 may be particularly useful in hand held or portable products that include multiple user interface devices.

Figure 4:
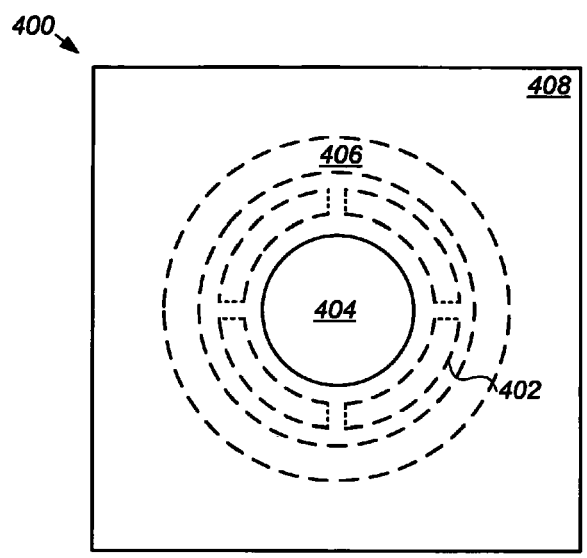
FIG. 4 is a block diagram of a planar top view of an interface device including additional touch or proximity sensors between the guard-sensor and window to the optical navigation sensor for additional input or selection operations in another embodiment.

In another embodiment, shown in FIG. 4, the second or additional sensors of the interface device 400 can include multiple capacitive sensors 402 surrounding a small circular window 404 and positioned inside a guard-sensor 406 in the enclosure 408. As above, the multiple capacitive sensors 402 can be used to select a function or input data using a tap or double tap gesture. In addition, the multiple capacitive sensors 402 can be used to with a laser optical navigation sensor to ensure complete coverage of the window 404 by an actuator, thereby ensuring eye-safe operation.

Figure 5:
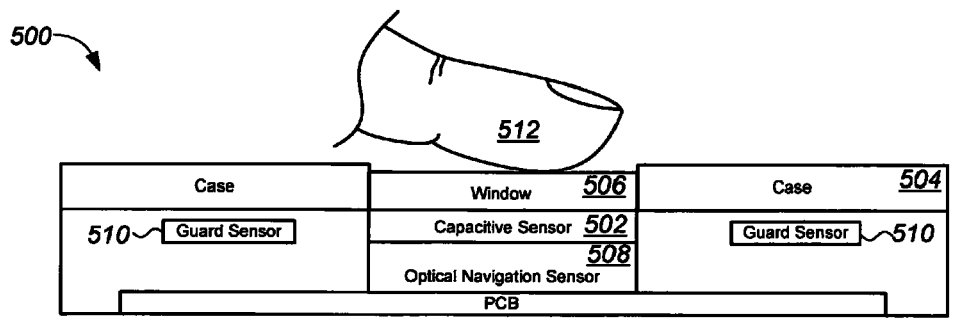
FIG. 5 is a block diagram in cross-section of an interface device including a proximity sensor between the window and optical navigation sensor for additional input or selection operations in an embodiment.
Figure 6:
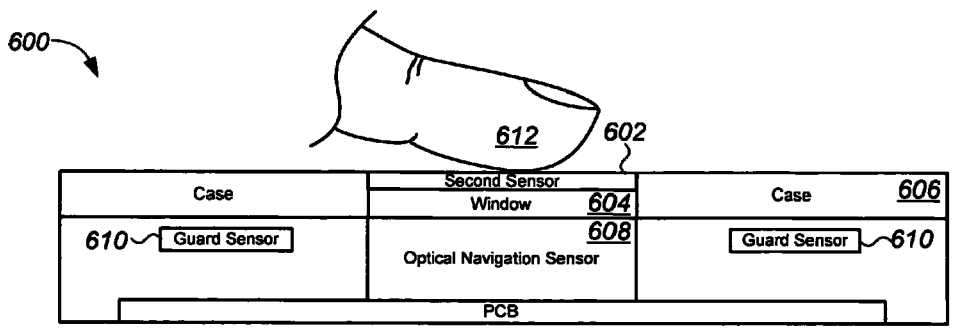
FIG. 6 is a block diagram in cross-section of an interface device including a touch sensor overlaying the window to the optical navigation sensor for additional input or selection operations in an embodiment.

In other embodiments, shown in FIGS. 5 and 6, additional touch or proximity sensitive sensors or switches can include a transparent sensor overlying the optical navigation sensor that is substantially transparent to at least one wavelength of light emitted from the illuminator. Because the additional sensors or switches sense change in capacitance (or resistance), they can be configured to be operated by a tap or double tap gesture by the same actuator in continuous proximity or contact with the window for operation of the optical navigation sensor.

Referring to FIG. 5, in one embodiment the interface device 500 includes a number of additional or second capacitive sensors 502 in the enclosure 504 between the window 506 and the optical navigation sensor 508. As in the embodiment described above with respect to FIG. 3, the threshold change in capacitance for the second capacitive sensors 502 is lower than that of the guard-sensors 510 to enable the second capacitive sensors to be operated by an actuator 512, such as a thumb or finger.

In yet another embodiment, shown in FIG. 6, the interface device 600 includes a number of second sensors 602 overlying the window 604 in the enclosure 606. As described above, the second sensors 602 are substantially transparent to at least one wavelength of light emitted from the optical navigation sensor 608. The second sensors 602 can include a number of proximity sensors, such as capacitive sensors, or a number of touch sensitive sensors such as resistive sensors. Where the second sensors 602 include capacitive sensors, the threshold change in capacitance for the second sensors is set lower than that of the guard-sensors 610 to enable the second capacitive sensors to be operated by an actuator 612, such as a thumb or finger.

In still another embodiment, not shown, the interface device can further include a hardware or software switch to turn-off or disable the guard-sensors and, where applicable, the secondary sensors. This enables the interface device to be operated by sliding or moving the device relative to a surface, similar to the operation of an optical mouse, rather than by movement of an actuator across a window of the device. This embodiment is particularly useful where the interface device is included in a handheld product, such as a cellular telephone or PDA, and can be used to enable the device to function as an electronic tape-measure measuring a distance over which it is moved. Alternatively, the interface device can be used capture an image of the surface over which it is held or moved. For example to scan text or a figure on a map or other document.

Figure 7:
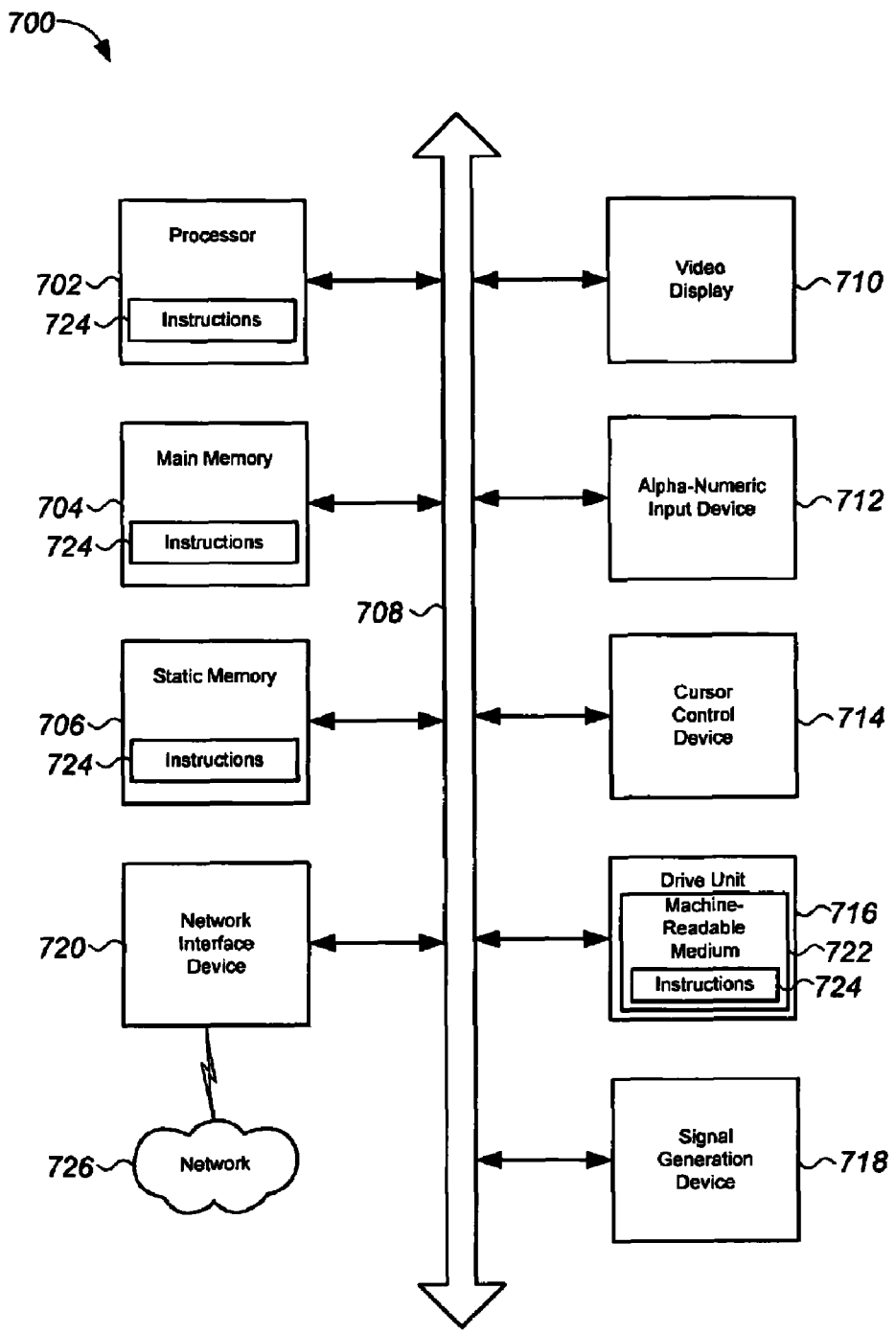
FIG. 7 shows a diagrammatic representation of machine in the example form of a computer system within which a set of instructions, for causing the machine to perform any one or more of the methodologies, processes, or operations discussed herein, may be executed.

FIG. 7 shows a diagrammatic representation of a machine in the form of a computer system 700 within which a set of instructions, for causing the machine to perform any one or more of the methodologies, processes, or operations discussed herein, may be executed. In some embodiments, a computer system 700 may be used for sensing movement of an actuator across a surface of a window in an enclosure of an interface device.

The machine can operate as a standalone device or, in alternative embodiments, may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., an interface device), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for using an interface device to sense movement of an actuator across a surface of a window in an enclosure of the device have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

In the forgoing description, for purposes of explanation, numerous specific details have been set forth in order to provide a thorough understanding of the control system and method of the present disclosure. It will be evident however to one skilled in the art that the present interface device and method may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the control system or method. The appearances of the phrase "one embodiment" in various places in the specification do not necessarily all refer to the same embodiment. The term "to couple" as used herein may include both to directly connect and to indirectly connect through one or more intervening components.

What is claimed is:

1. An interface device for sensing movement of an actuator across a surface of a window in an enclosure thereof, the interface device comprising:
    an optical navigation sensor including:
        an illuminator enclosed within the enclosure to illuminate at least a portion of the actuator through the window when the portion of the actuator is positioned in contact with the surface of the window; and
        a detector to receive light reflected through the window from the portion of the actuator;
    a proximity sensor comprising a number of guard-sensors in the enclosure adjacent to the optical navigation sensor and circumscribing the window programmed to distinguish between a threshold change in capacitance induced by a finger acting as the actuator and a threshold change in capacitance induced by a hand acting as the actuator, the proximity sensor configured to disable the optical navigation sensor when the threshold change in capacitance detected by the number of guard-sensors indicates the hand acting as the actuator; and
    a number of additional capacitive sensors circumscribing the window and positioned between the window and the number of guard-sensors, the additional capacitive sensors configured to detect threshold changes in capacitance that are lower than threshold changes in capacitance detectable by the guard-sensors and to affirmatively enable or disable the optical navigation sensor.

2. An interface device according to claim 1, where the number of guard-sensors comprise at least two capacitive sensors on different sides of the optical navigation sensor.

3. An interface device according to claim 1, wherein the number of guard-sensors comprise a guard-ring.

4. An interface device according to claim 1, wherein the number of touch sensitive sensors comprise capacitive sensors in the enclosure between the number of guard-sensors and the window.

5. An interface device according to claim 1, wherein the number of touch sensitive sensors comprise a transparent touch sensitive sensor overlying the optical navigation sensor that is substantially transparent to at least one wavelength of light emitted from the illuminator.

6. An interface device according to claim 5, wherein the transparent touch sensitive sensor comprises a capacitive sensor between the window and the optical navigation sensor.

7. An interface device according to claim 1, wherein the number of guard-sensors comprise a number of capacitive sensors further configured to execute additional input operations on sensing the actuator in proximity thereto.

8. An interface device according to claim 1, wherein the optical navigation sensor is a speckle-based sensor and the illuminator comprises a coherent light source.

9. An interface device according to claim 8, wherein the window is a multilayer filter-window including one or more anti-reflective layers and filter layers to attenuate light with wavelengths different from those of the coherent light source.

10. A method for using an interface device for sensing movement of an actuator across a surface of a window in an enclosure of the device, the method comprising:
    illuminating with an illuminator of an optical navigation sensor within the enclosure at least a portion of the actuator through the window when the portion of the actuator is positioned in contact with the surface of the window;

receiving with a detector of the optical navigation sensor light reflected through the window from the portion of the actuator;

sensing the actuator with a proximity sensor comprising a number of guard-sensors in the enclosure adjacent to the optical navigation sensor and circumscribing the window;

disabling the optical navigation sensor when a threshold change in capacitance is detected by the proximity sensor as being induced by a hand as the actuator;

detecting threshold changes in capacitance that are lower than threshold changes in capacitance detectable by the guard-sensors using a number of additional capacitive sensors circumscribing the window and positioned between the window and the number of guard-sensors; and using the additional capacitive sensors to disable or enable the optical navigation sensor.

11. A method according to claim 10, wherein the number of guard-sensors include at least two capacitive sensors on different sides of the optical navigation sensor, and wherein disabling the optical navigation sensor comprises disabling the optical navigation sensor when the threshold change in capacitance is detected by both of the at least two capacitive sensors.

12. A method according to claim 10, wherein the number of guard-sensors comprise a guard-ring of one or more capacitive sensors circumscribing the window, and wherein disabling the optical navigation sensor comprises disabling the optical navigation sensor when a change in capacitance above a predetermined threshold is sensed in the guard-ring.

13. A method according to claim 10, wherein the interface device includes a number of touch sensitive sensors adjacent to the optical navigation sensor, and wherein the method further comprises sensing and additional input operation using the number of touch sensitive sensors.

14. A method according to claim 13, wherein the additional capacitive sensors are disposed in the enclosure between the number of guard-sensors and the window.

15. A method according to claim 13, wherein the number of touch sensitive sensors comprise a transparent touch sensitive sensor overlying the optical navigation sensor that is substantially transparent to at least one wavelength of light emitted from the illuminator.

16. A method according to claim 15, wherein the transparent touch sensitive sensor comprises a capacitive sensor between the window and the optical navigation sensor.

17. A non-transitory computer-readable medium, containing a set of instructions that causes a computer to perform a process comprising:

illuminating at least a portion of an actuator through a window in an enclosure when a portion of the actuator is positioned in contact with a surface of the window;

receiving light reflected through the window from the portion of the actuator by a detector;

sensing the actuator with a proximity sensor comprising a number of guard-sensors in the enclosure adjacent to the optical navigation sensor and circumscribing the window;

disabling signals from the detector when a threshold change in capacitance is detected by the proximity sensor as being induced by the hand as the actuator;

detecting threshold changes in capacitance that are lower than threshold changes in capacitance detectable by the guard-sensors using a number of additional capacitive sensors circumscribing the window and positioned between the window and the number of guard-sensors; and using the additional capacitive sensors to disable or enable the optical navigation sensor.

18. The non-transitory computer-readable medium according to claim 17, wherein the number of guard-sensors comprise a guard-ring of one or more capacitive sensors circumscribing the window.

* * * * *